US 12,503,875 B2

(12) United States Patent
Schwimmer

(10) Patent No.: US 12,503,875 B2
(45) Date of Patent: Dec. 23, 2025

(54) WATER EGRESS SYSTEM

(71) Applicant: International Leisure Product Inc., Edgewood, NY (US)

(72) Inventor: Jordan Schwimmer, New York, NY (US)

(73) Assignee: International Leisure Product Inc., Edgewood, NY (US)

( * ) Notice: Subject to any disclaimer, the term of this patent is extended or adjusted under 35 U.S.C. 154(b) by 322 days.

(21) Appl. No.: 18/201,579

(22) Filed: May 24, 2023

(65) Prior Publication Data

US 2024/0392596 A1    Nov. 28, 2024

(51) Int. Cl.
*E04H 4/14* (2006.01)
(52) U.S. Cl.
CPC .................... *E04H 4/144* (2013.01)
(58) Field of Classification Search
CPC ...................................... E04H 4/144
USPC ............................................. 4/496
See application file for complete search history.

(56) References Cited

U.S. PATENT DOCUMENTS

| | | | | |
|---|---|---|---|---|
| 6,273,774 B1* | 8/2001 | Warzecha | ................. | B63B 7/02 441/130 |
| 6,643,879 B1* | 11/2003 | Davis | ..................... | A01K 1/035 14/69.5 |
| 6,722,307 B1* | 4/2004 | Rogers | ................... | A01K 1/035 182/206 |
| 7,735,457 B2* | 6/2010 | O'Connor | ............... | E04H 4/144 119/753 |
| 9,121,190 B1* | 9/2015 | Douglas | ................... | E04H 4/144 |
| D1,005,620 S * | 11/2023 | Centorbi | ...................... | D30/199 |

* cited by examiner

*Primary Examiner* — Huyen D Le
(74) *Attorney, Agent, or Firm* — Meister Seelig & Fein PLLC

(57) ABSTRACT

In an embodiment, a water egress system is disclosed that provides individuals or pets with ease of access to elevated areas from the water. The water egress system includes a buoyant base including a ramp. The water egress system further includes a bolster disposed proximate to a surface of the base and an attachment mechanism that is configured to secure the bolster to the base.

28 Claims, 18 Drawing Sheets

WATER EGRESS SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

This application relates to a water egress system, and in particular, to a water egress system that provides individuals or pets with ease of access to elevated areas from the water.

Pets such as dogs often have difficulty accessing tall or sheer surfaces from the water, especially if the dogs are smaller, older, or have joint or muscle conditions such as arthritis. One example of where this arises is when dogs try to climb up onto boats or docks while swimming in the water, or onto other elevated areas such as the sides of above-ground pools. Existing stairs, ramps, step ladders, and other traditional climbers do not effectively solve this problem since they are not adjustable to accommodate each pet's unique size, age, or health conditions, or are not relocatable to accommodate a variety of use cases. The inability for dogs to get to desired areas from the water using traditional climbers often results in them repeatedly attempting to climb out using their forelimbs, often unsuccessfully, or swimming around looking for a more easily accessible exit from the water if one is available, which may be tiring. In some cases, pet owners may have to lift or physically aid their pets in climbing up out of the water, all of which are time-consuming, strenuous, and potentially hazardous to both the pet and the owner.

SUMMARY

In an embodiment, a water egress system is disclosed. The water egress system comprises a buoyant base comprising a ramp. The water egress system comprises a bolster disposed proximate to a surface of the base and an attachment mechanism that is configured to secure the bolster to the base.

In an embodiment, the bolster is removably attached to the base by the attachment mechanism.

In an embodiment, the water egress system is configured to transition between a boost configuration and an extended configuration. The bolster is disposed proximate to a top surface of the base when the water egress system is in the boost configuration, and the bolster is disposed proximate to a side surface of the base when the water egress system is in the extended configuration. The water egress system has a first height and a first length when the water egress system is in the boost configuration and a second height and a second length when the water egress system is in the extended configuration. The first height is greater than the second height, and the first length is smaller than the second length.

In an embodiment, the water egress system is configured to transition to an angled extended configuration. In the angled extended configuration, the bolster is disposed proximate to the side surface of the base at a variable angle to the base. In the angled extended configuration, the water egress system has a variable height based at least in part on the variable angle. The variable height is between the second height and a third height, and the third height is greater than the first height. In the angled extended configuration, the water egress system has a variable length based at least in part on the variable angle between the first length and the second length.

When the water egress system is in the extended configuration, a top surface of the bolster is about level with the top surface of the base.

In an embodiment, the water egress system comprises a strap. The bolster comprises a first attachment point and the base comprises a second attachment point. The strap is configured to secure the bolster to the base using the first attachment point and the second attachment point. The strap is adjustable to increase and decrease a tension of the bolster against the surface of the base. The water egress system comprises a third attachment point that is configured to removably attach the water egress system to an elevated platform.

In an embodiment, the ramp is removably attached to the base. The ramp is removably attached to the base using a corded attachment.

In an embodiment, the ramp comprises a mesh fabric and a weight mechanism that is configured to keep at least part of the mesh fabric submerged underwater.

In an embodiment, the ramp comprises a plurality of treads.

In an embodiment, at least one of the base and the bolster comprise a drop stitch material having inflatable, buoyant, and portable properties.

In an embodiment, at least one of the base and the bolster comprise a grip surface.

In an embodiment, a method is disclosed. The method comprises transitioning a water egress system between a boost configuration and an extended configuration. The water egress system comprises a buoyant base, a bolster, and an attachment mechanism that is configured to secure the bolster to the base. The bolster is disposed proximate to a first surface of the base when the water egress system is in the boost configuration and is disposed proximate to a second surface of the base when the water egress system is in the extended configuration.

In an embodiment, the water egress system has a first height and a first length when the water egress system is in the boost configuration and a second height and a second length when the water egress system is in the extended configuration. The first height is greater than the second height, and the first length is smaller than the second length.

In an embodiment, the method comprises transitioning the water egress system to an angled extended configuration. In the angled extended configuration, the bolster is disposed proximate to the second surface of the base at a variable angle to the base. In the angled extended configuration, the water egress system has a variable height based at least in part on the variable angle. The variable height is between the second height and a third height, and the third height is greater than the first height. In the angled extended configuration, the water egress system has a variable length based at least in part on the variable angle between the first length and the second length.

In an embodiment, the water egress system comprises a strap that is configured to attach to the bolster and to the base. The method comprises adjusting a tension of the bolster against the base by adjusting the strap. The method comprises detaching the strap prior to transitioning the bolster between the boost configuration and the extended configuration.

The foregoing summary is illustrative only and is not intended to be in any way limiting. These and other illustrative embodiments include, without limitation, apparatus, systems, methods and computer-readable storage media. In addition to the illustrative aspects, embodiments, and features described above, further aspects, embodiments, and features will become apparent by reference to the drawings and the following detailed description.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein. Example embodiments are provided merely to be illustrative. It is to be understood that other embodiments may be utilized and structural changes may be made without departing from the scope of the illustrative embodiments. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Figure 9:
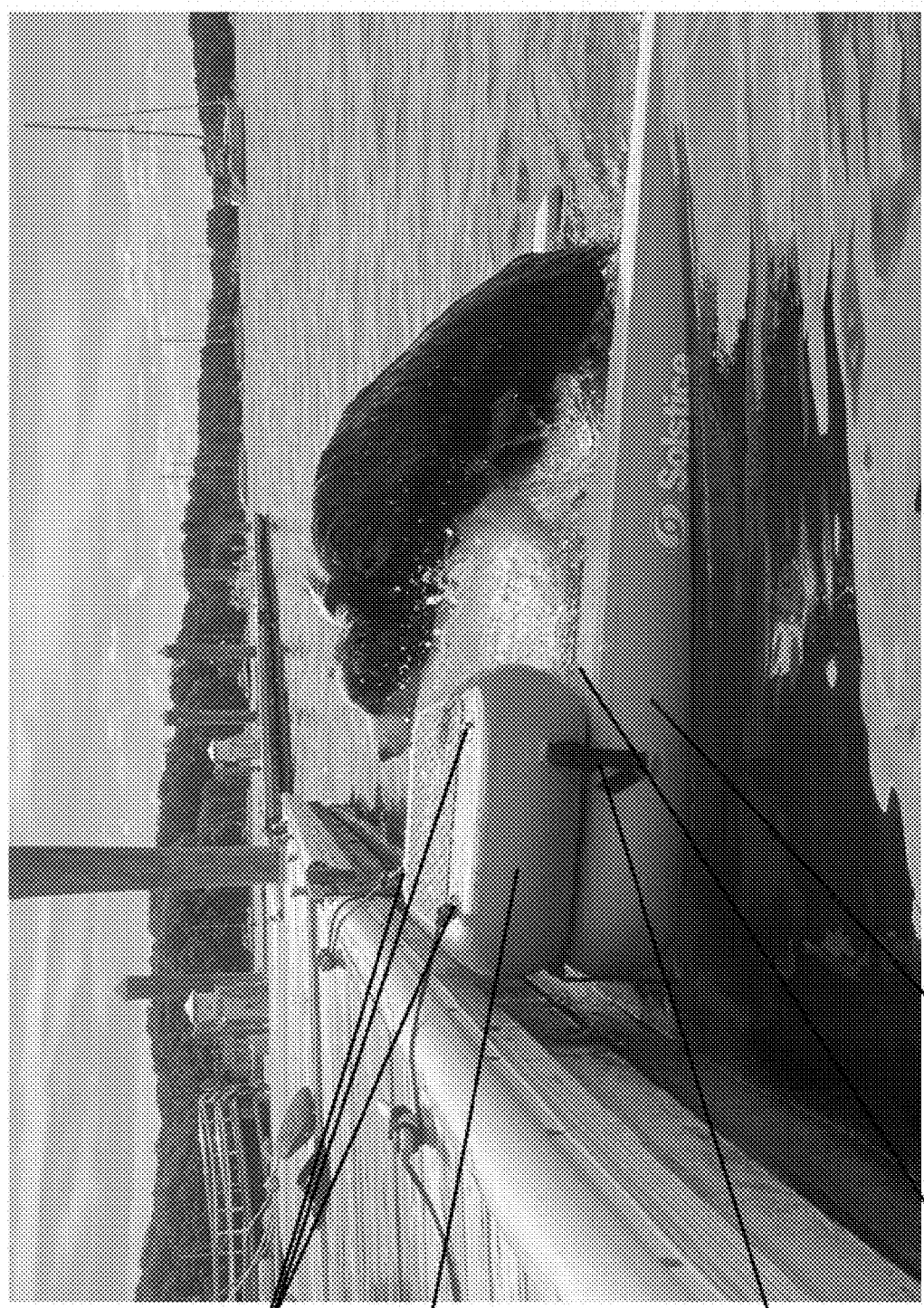
FIG. 9 is a left perspective view of the water egress system of FIG. 1 during an example use case with a pet according to an embodiment.
Figure 10:
FIG. 10 is a left perspective view of the water egress system of FIG. 1 during an example use case with a pet according to an embodiment.
Figure 11:
FIG. 11 is a right perspective view of the water egress system of FIG. 1 during an example use case with a pet according to an embodiment.
Figure 18:

With reference to FIGS. 1-18, a water egress system 100 is disclosed that comprises a buoyant platform for providing individuals or pets with ease of access out of the water to elevated areas, such as boats, docks, or pools. In some embodiments, the water egress system 100 may also or alternatively be used as a water ingress system. For example, as illustrated in FIGS. 10, 11, and 18, smaller pets and younger individuals may also use the water egress system 100 for ease of access into the water from an elevated area, such as a boat, dock, or pool. The buoyant platform may be inflatable, foam filled, or buoyant in another manner. The water egress system 100 is adjustable and convertible, comprising a floating base 102 and a bolster 104. A top surface 136 of the base 102 comprises the surface of the base 102 which is opposite to the surface of the base 102 which is in contact with the water when base 102 is positioned on the water.

The base 102 comprises arms 106 extending outwardly from the base 102. In some embodiments, the arms 106 extend from the base 102 parallel to each other. In some embodiments, the arms 106 extend perpendicular to the base 102 or at any other angle to the base 102. The arms 106 may be disposed at end portions 124 of the base 102 that are opposite to an attachment point 126 of the bolster 104.

The base 102 further comprises a ramp 108. In some embodiments, the ramp 108 may comprise at least one of a mesh or otherwise pliable fabric and a hard material. Also or alternatively, the ramp 108 may comprise at least one of ropes, cords, netting, and any material configured to provide a ramp. In some embodiments, at least some of the materials of the ramp 108 may be stitched together to form the ramp 108.

The ramp 108 is removably attached to the base 102, to one or more of the arms 106, or to any combination thereof. In some embodiments, for example, the ramp 108 is removably attached to the base 102 and to each of the arms 106. The ramp 108 may be attached to the base 102, the arms 106, or to any combination thereof using an attachment mechanism 110. In some embodiments, the attachment mechanism 110 may comprise, for example, a corded attachment such as that shown in FIGS. 1 and 2 where a cord 137 or rope is stitched through corresponding loops 128 of a fabric strip 138 on the base 102, corresponding loops 130 of a fabric strip 140 on the arms 106, and corresponding loops 132 of a fabric strip 142 on the ramp 108. The corded attachment may provide improved strength and long-lasting durability as compared to an attachment system where, for example, a ramp is welded directly onto a base or arms. In other embodiments, the ramp 108 may also or alternatively be attached to the base 102, one or more of the arms 106 or any combination thereof by any other attachment mechanism 110 including, for example, snap button closures, hook and loop fasteners, zippers, hooks, clasps, adhesives, snap fit, welding or any other fastener mechanism.

Figure 1:
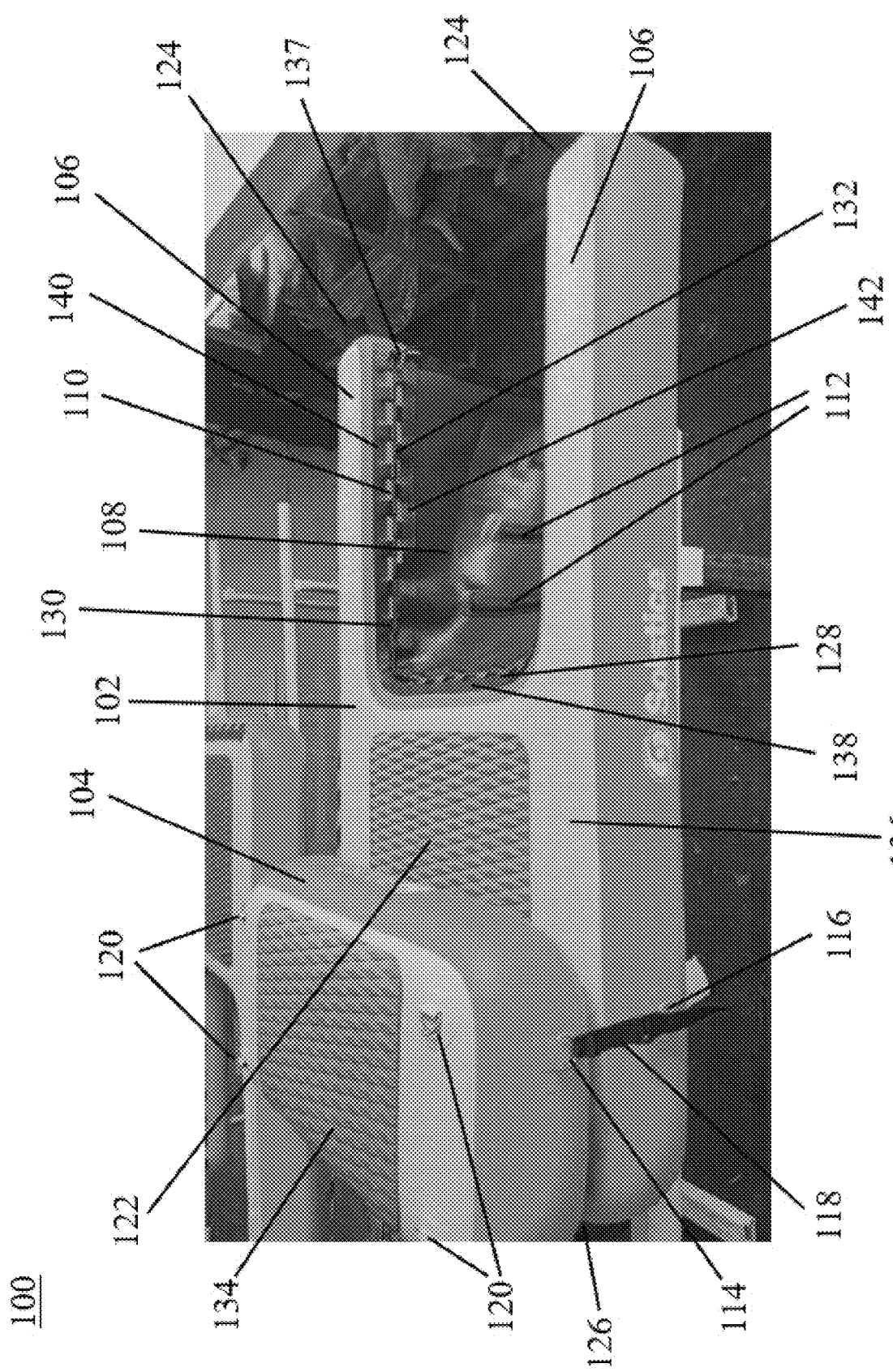
FIG. 1 is a left perspective view of a water egress system according to an embodiment.
Figure 2:
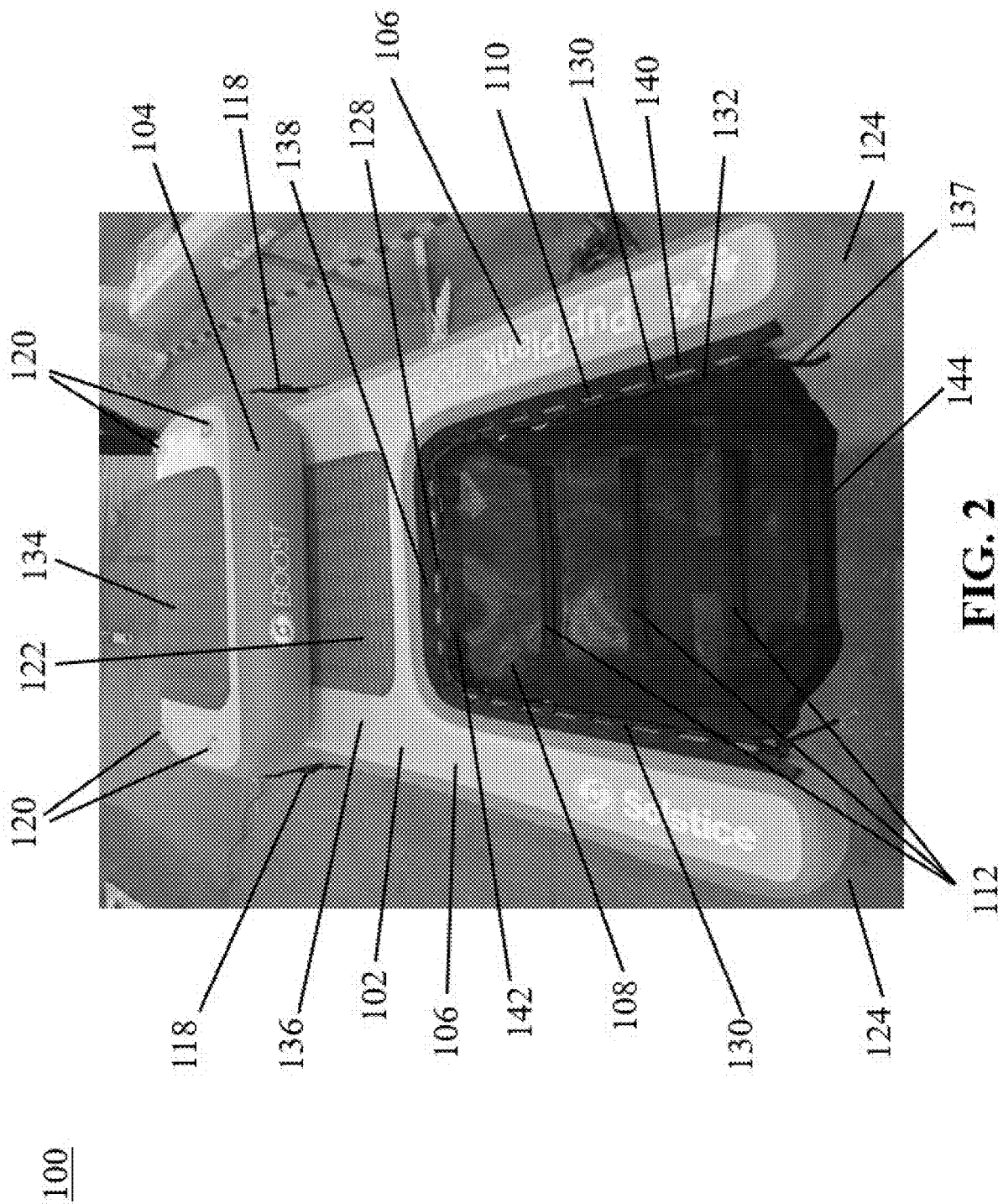
FIG. 2 is a top perspective view of the water egress system of FIG. 1 according to an embodiment.

With reference to FIGS. 1 and 2, the ramp 108 comprises a plurality of treads 112 that are configured for use by a pet or other individual using the water egress system 100 to climb out of the water via the ramp 108. An example of a pet climbing out of the water using the ramp 108 and treads 112 is shown in in FIGS. 8, 9 and 16. In some embodiments, the treads 112 may also or alternatively comprise rungs, footholds, or traversable netting for use by an individual or pet that is using the water egress system 100 to climb out of the water. In some embodiments, the treads 112 may be disposed parallel to each other. In some embodiments, the treads 112, together with a stitching or configuration of the ramp 108, may form steps or stairs for the individual or pet to "walk" up to egress from the water onto the base 102 or to ingress into the water from the base 102. In some embodiments, the material of the ramp 108 may form stairs or another configuration that supports and assists the egress or ingress of an individual or pet from or into the water without utilizing the treads 112. For example, the material of the ramp 108 may be stitched or joined together in a manner that defines steps or standing surfaces.

In some embodiments, the treads 112 are specifically sized and spaced apart such that they are configured for use by an individual. For example, the treads 112 may be a larger size and spaced further apart when the water egress system 100 is configured for use by an individual as compared to when the water egress system 100 is configured for use by a pet.

Figure 4:
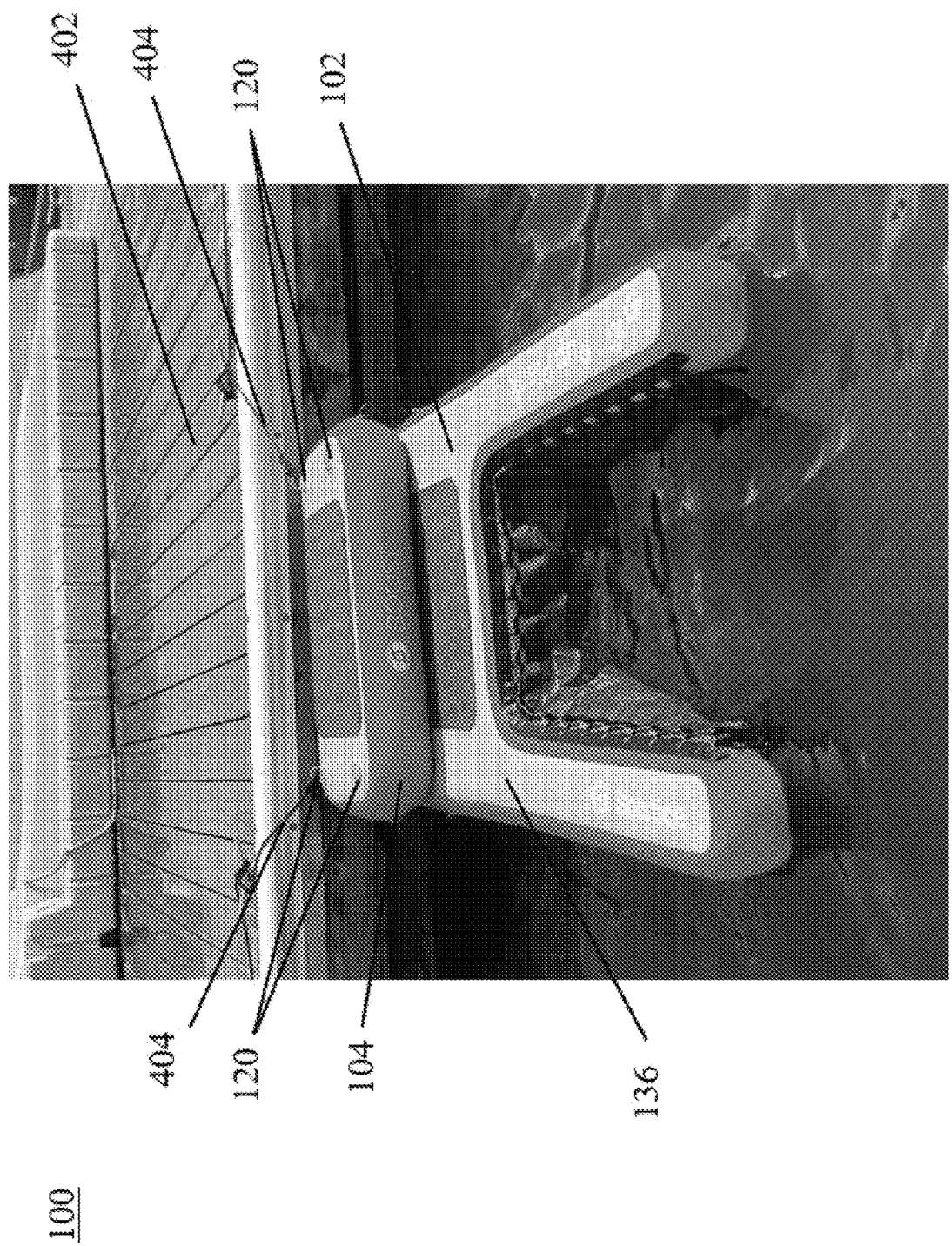
FIG. 4 is a front perspective view of the water egress system of FIG. 1 during an example use case with a bolster engaged against a dock in a boost configuration according to an embodiment.
Figure 5:
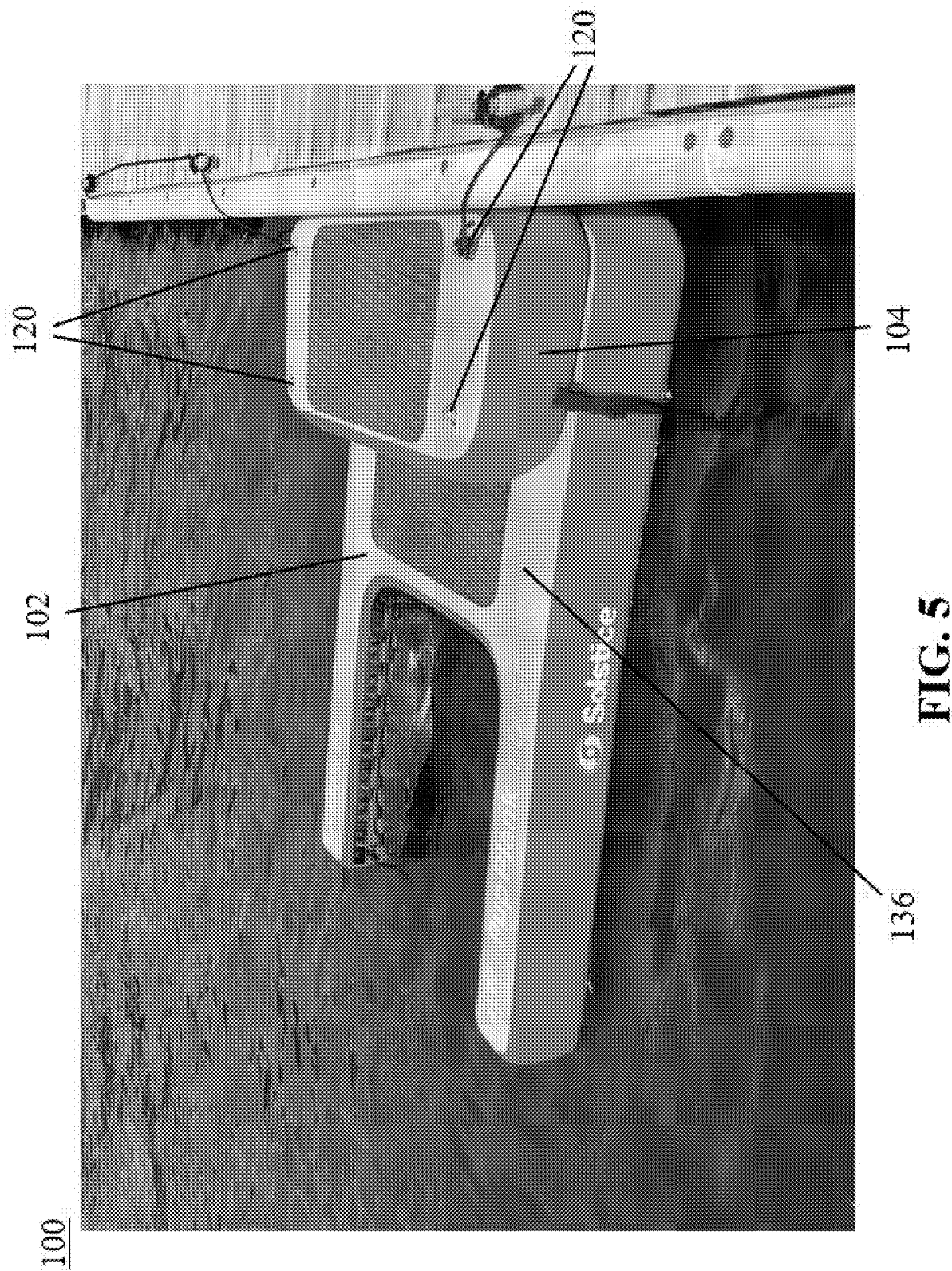
FIG. 5 is a right perspective view of the water egress system of FIG. 1 during an example use case with a bolster engaged against a dock in a boost configuration according to an embodiment.
Figure 6:
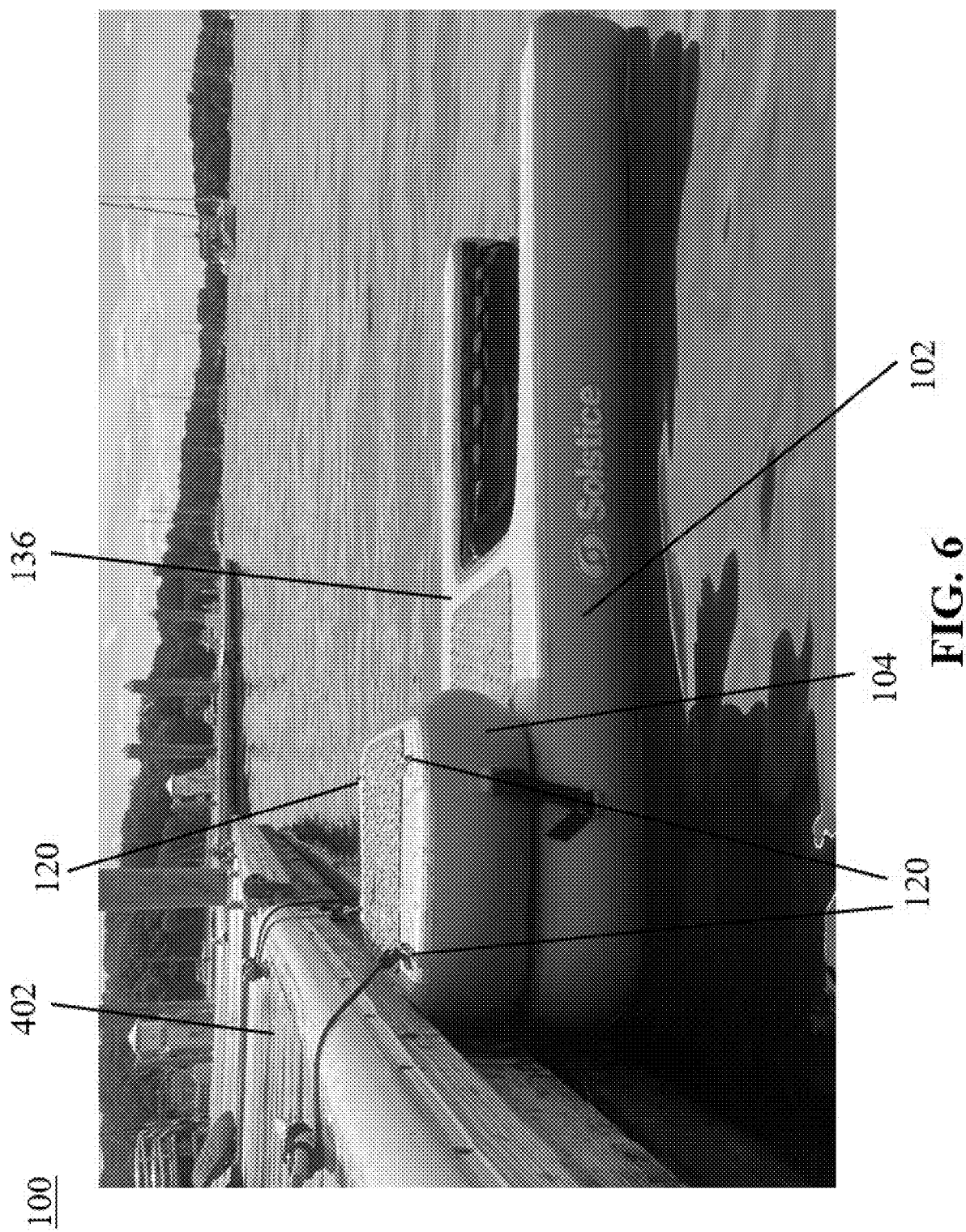
FIG. 6 is a left perspective view of the water egress system of FIG. 1 during an example use case with a bolster engaged against a dock in a boost configuration according to an embodiment.
Figure 7:
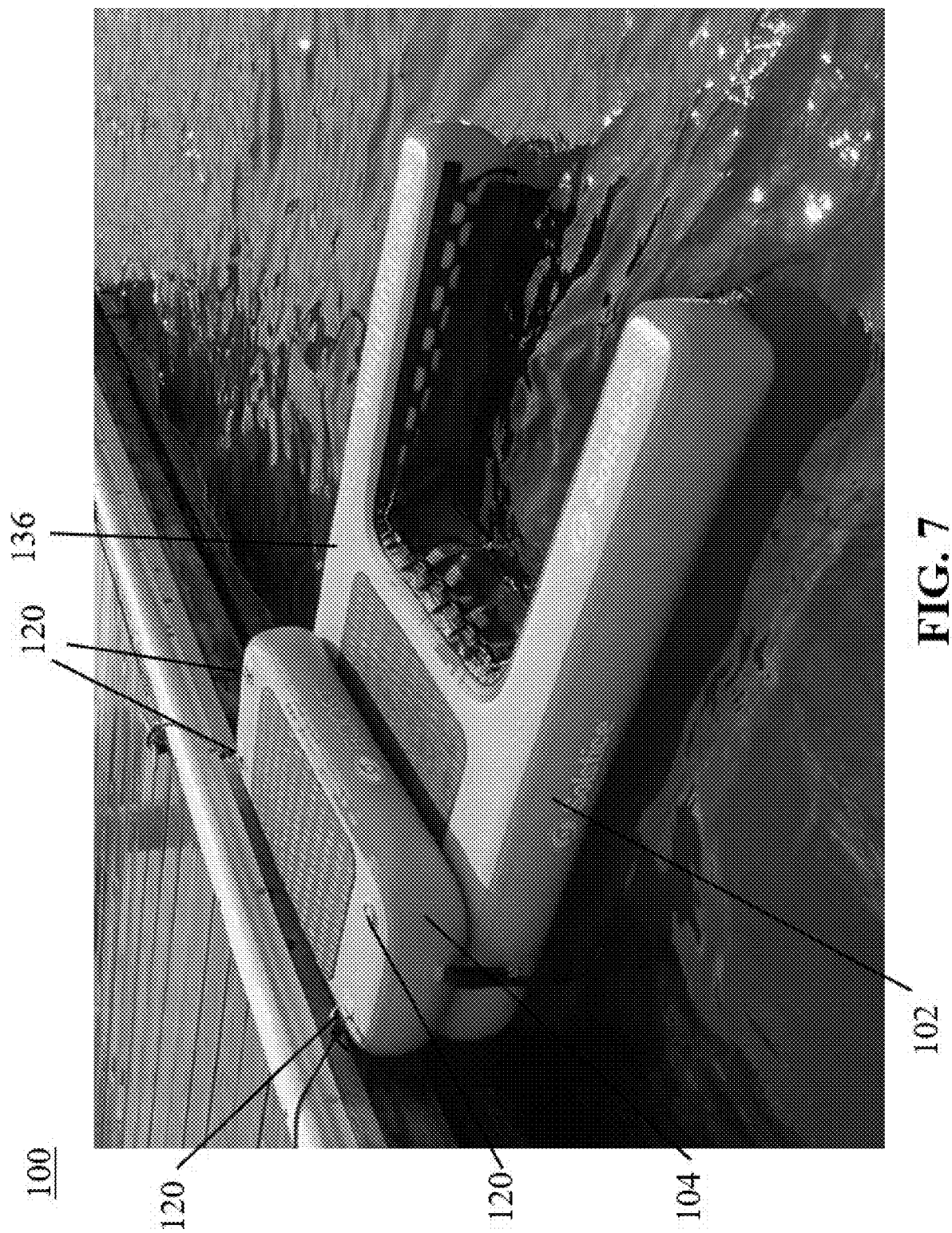
FIG. 7 is a perspective view of the water egress system of FIG. 1 during an example use case with a bolster engaged against a dock in a boost configuration according to an embodiment.
Figure 8:
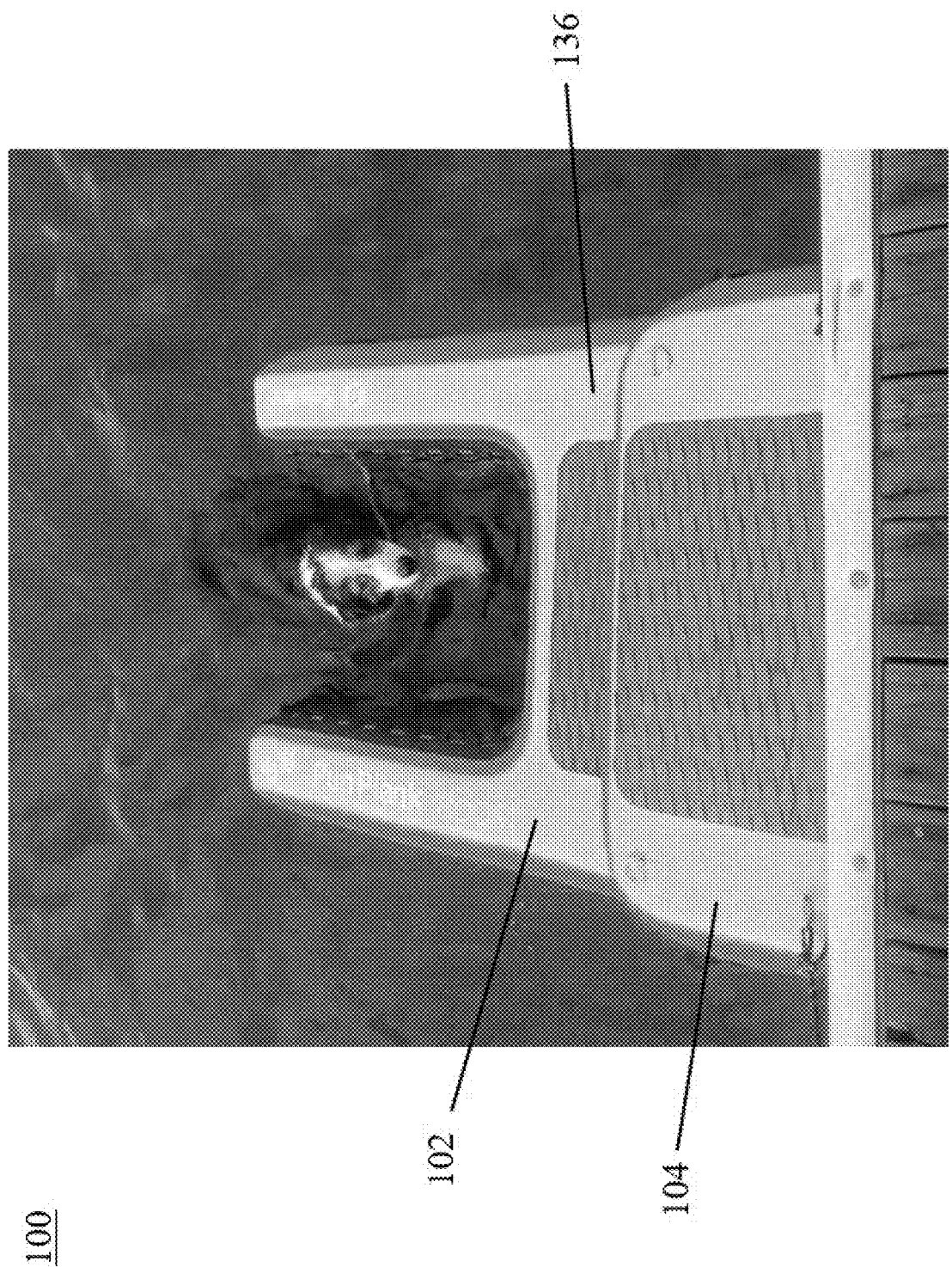
FIG. 8 is a top view of the water egress system of FIG. 1 during an example use case with a pet according to an embodiment.

A weight mechanism 144 (FIG. 2) may be permanently or removably attached to the ramp 108. The weight mechanism 144 is configured to keep at least part of the ramp 108 submerged underwater and to inhibit the ramp 108 from floating to a surface of the water, as shown in FIG. 4. The weight mechanism 144 is further configured to maintain the ramp 108 in an open or unfolded configuration, such that the ramp 108 is accessible for egress out of the water. In an embodiment, the weight mechanism 144 is situated within a sleeve which is sewn into the material comprising the ramp 108. In other embodiments, for example, the weight mechanism 144 may be built into, sewn into, snap buttoned, roped, corded, hook and loop fastened, zippered, hooked, clasped, snap fitted, adhered to or otherwise attached or integrated into the ramp 108 in any other manner. In an embodiment, the weight mechanism 144 comprises a stainless steel bar. In other embodiments, the weight mechanism 144 may comprise, for example, a waterproof sandbag. In other embodiments, the weight mechanism 144 may comprise a rod, plank, pipe, or bar comprising at least one of aluminum, titanium, rubber, PET (polyethylene terephthalate), PVC (polyvinyl chloride), PS (polystyrene), and any other waterproof, non-corrosive, non-buoyant material that is configured to keep at least part of the ramp 108 submerged underwater.

In an embodiment, the weight mechanism 144 is permanently or removably attached to an end of the ramp 108 which is situated in the water, between the end portions 124 of the base 102. In some embodiments, the water egress system 100 comprises one or more weight mechanisms 144 that are permanently or removably attached to the ramp 108. For example, the one or more weight mechanisms 144 may be permanently or removably attached to each of the treads 112. In some embodiments, the weight mechanisms 144 may be permanently or removably attached to the surface of the ramp 108 which is in contact with the water when base 102 is positioned on the water, for example, under each of the treads 112.

In some embodiments, the treads 112 may comprise stiffening or support members which are configured to hold the ramp 108 in position while in use. The stiffening or support members are configured to operate in a similar manner to and may comprise like materials and methods of attachment as the weight mechanism 144 or the treads 112. In some embodiments, the stiffening or support members may comprise EVA (ethylene-vinyl acetate) foam or similar foam materials. In some embodiments, the stiffening or support members may be permanently or removably attachable to the side walls of each of the treads 112, for example, in an embodiment where the treads 112 comprise steps or stairs.

The bolster 104 is attached to the base 102 by, for example, a strap 118 that is configured to connect to an attachment point 114 of the bolster 104 and an attachment point 116 of the base 102. The strap 118 is configured to provide stability while the water egress system 100 is in use, for example, by inhibiting lateral movement of the bolster 104 when a dog or individual steps onto bolster 104 to access the higher elevation, as shown in FIG. 9. In some embodiments, the bolster 104 comprises a plurality of attachment points 114 and the base 102 comprises a plurality of corresponding attachment points 116 where, for example, each attachment point 114 on the bolster 104 may have a corresponding attachment point 116 on the base 102. In some embodiments, a plurality of the straps 118 may be utilized to attach the bolster 104 to the base 102 using multiple corresponding attachment points 114 and 116. The strap 118 may removably attach the bolster 104 to the base 102 or may permanently attach the bolster 104 to the base 102. Any other attachment mechanism may also or alternatively be utilized instead of or in addition to the strap 118. In some embodiments, the strap 118 may be adjustable in length to adjust an amount of tension on strap 118 and a spacing or tightness of the attachment of the bolster 104 to the base 102.

In some embodiments, one or more of the attachment points 114 of the bolster 104 may correspond to one or more of the attachment points 116 of the base 102 where, for example, the attachment points 114 of the bolster 104 may have one-to-one relationships with corresponding attachment points 116 of the base 102, many-to-one relationships with corresponding attachment points 116 of the base 102, one-to-many relationships with the corresponding attachment points 116 of the base 102, or any other relationship with the attachment points 116 of the base 102.

The bolster 104 may also comprise one or more attachment points 120, for example, on a different side of the bolster 104 from attachment points 114. For example, attachment points 114 may be on a side surface of the bolster 104, while attachment points 120 may be on a top surface of the bolster 104. Other attachment points may also or alternatively be located on a bottom surface of the bolster 104 or located on another side surface of the bolster 104. Attachment points 120 may be utilized to, for example, removably or permanently attach the water egress system 100 to a boat, dock, pool, or any other elevated surface or platform to which egress is desired, for example, as shown in FIGS. 4-7, 9, and 12. In some embodiments, attachment points 120 may be utilized to attach any other component to the water egress system 100. As an example, in some embodiments, an additional bolster (not shown) may be attached to the bolster 104 at the attachment points 120. In some embodiments, a smaller bolster (not shown) may be attached to the bolster 104, for example, to provide an additional step that is configured to allow an individual or pet to reach a higher elevation than the base 102 and the bolster 104 alone. In some embodiments, a plank or bridge component may be attached to the attachment points 120 to extend a distance from the elevated surface from which the water egress system 100 may be deployed.

The water egress system 100 may be removably or permanently attached to an elevated surface such as a dock 402 by the attachment of a rope 404 to one or more of attachment points 114, 116, and 120, for example, as shown in FIG. 4. The water egress system 100 may also or alternatively be removably or permanently attachable to an elevated surface by, for example, the attachment of a strap, cord, bungee, elastic, carabiner, clip, or any other attachment mechanism to one or more of attachment points 114, 116 and 120. Attachment points 114, 116, and 120 may comprise anchors or any other attachment mechanism. In some embodiments, for example, attachment points 114, 116 and 120 may comprise snap button closures, hook and loop fasteners, zippers, hooks, clasps, adhesives, snap fit, or any other fastener mechanism.

The base 102 comprises a grip surface 122. The grip surface 122 may be configured to provide an individual or pet with a surface that has a higher coefficient of friction than other surfaces of the base 102. In some embodiments, for example, the grip surface 122 may be fabricated to have a non-slip or slip-inhibiting design, material, or coating that provides an individual or pet with a more controlled and confident surface on which to step that is configured for ease of walking and climbing, as shown in FIGS. 10 and 11. The grip surface 122 may be fabricated to have a claw resistant design, material, or coating that inhibits puncture, rupture, scratch, rip, tear, perforation, laceration, or any other form of damage to the base 102. In some embodiments, the grip surface 122 may comprise a traction pad which may, for example, comprise a diamond groove texture configured to provide added grip for ease of walking and climbing. In some embodiments, the grip surface 122 may comprise a high-density EVA-70 foam. In some embodiments, the high-density EVA-70 foam is disposed on the top surface of the base 102. In some embodiments, the high-density EVA-70 foam is glued to or otherwise adhered to the top surface of the base 102. In some embodiments the bolster 104 may also comprise a grip surface 134 that is similar to the grip surface 122 of the base 102, as shown in FIGS. 10 and 11. In some embodiments, the bolster 104 is configured for attachment adjacent to at least a portion of the grip surface 122. The bolster 104 may also or alternatively be configured for at least partial attachment on top of the grip surface 122.

Figure 3:
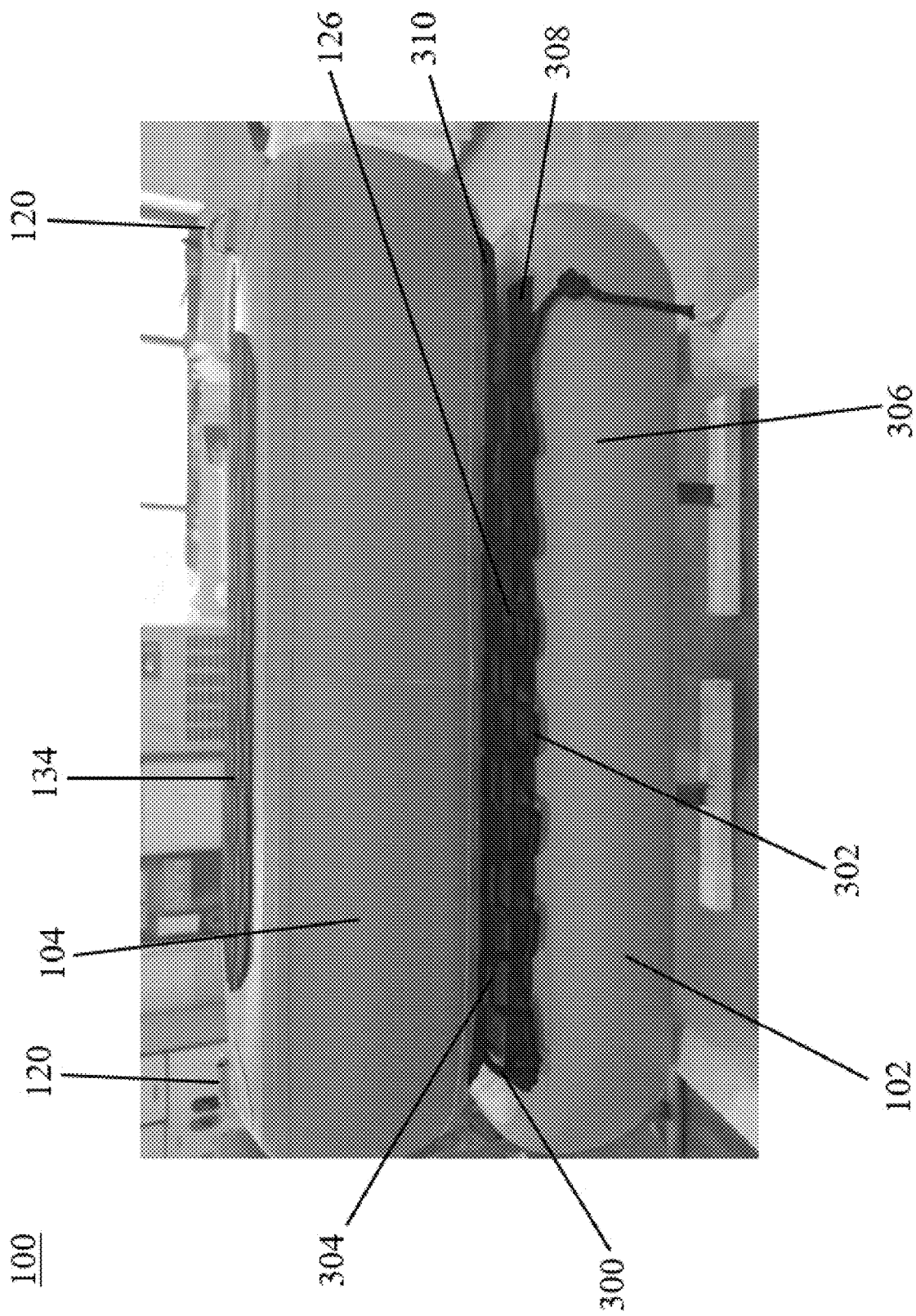
FIG. 3 is a rear view of the water egress system of FIG. 1 according to an embodiment.
Figure 12:
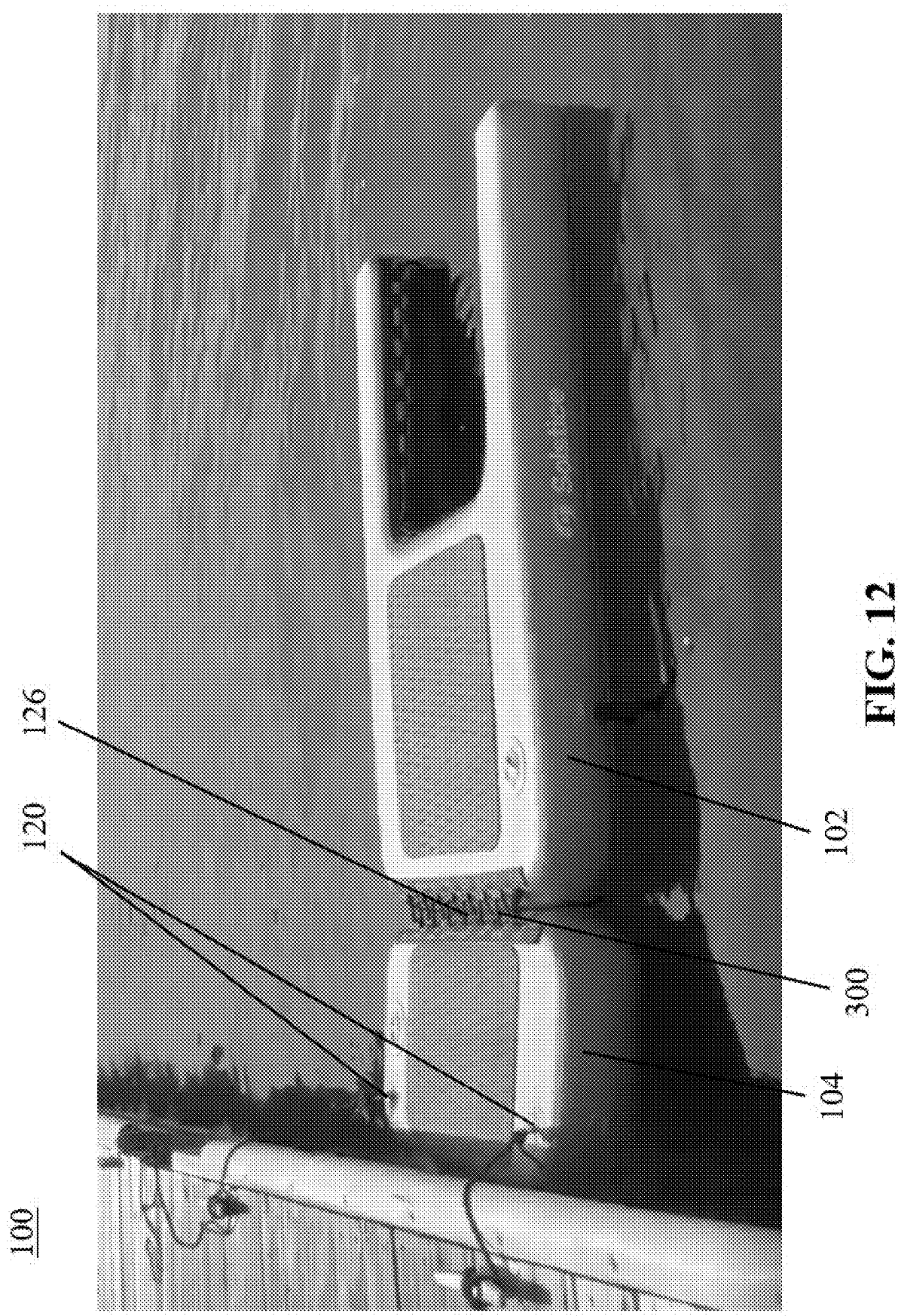
FIGS. 12-14 are left perspective views of an alternate configuration of the water egress system of FIG. 1 during an example use case with a bolster engaged against a dock in an extended configuration according to an embodiment.

With reference to FIGS. 3 and 12, the bolster 104 may also or alternatively be attached to the base 102 at the attachment point 126. In some embodiments, the bolster 104 may be removably or permanently attached to the base 102 at attachment point 126. The bolster 104 may be attached to the base 102 at the attachment point 126, for example, using a corded attachment 300, a rope, or other attachment mechanism. The corded attachment 300 may comprise a cord which is stitched through corresponding loops 302 of a fabric strip 308 on the base 102 and corresponding loops 304 of a fabric strip 310 on the bolster 104. The corded attachment 300 provides more strength and long-lasting durability than traditional attachment systems wherein, for example, features such as a bolster are welded directly onto a base. The corded attachment 300 is configured to act as a hinge between the base 102 and the bolster 104. Additional or alternative attachment mechanisms for removably or permanently attaching the bolster 104 to the base 102 may include snap button closures, hook and loop fasteners, zippers, hooks, clasps, adhesives, snap fit, or any other fastener mechanism. In some embodiments, the bolster 104 is removably or permanently attached to the base 102 by a hinge. In some embodiments, the bolster 104 is attached to at least part of the base 102 by a flap of the material comprising portions of at least one of the base 102 and the bolster 104, which is configured to act as a hinge between the base 102 and the bolster 104.

Figure 13:
Figure 14:
Figure 15:
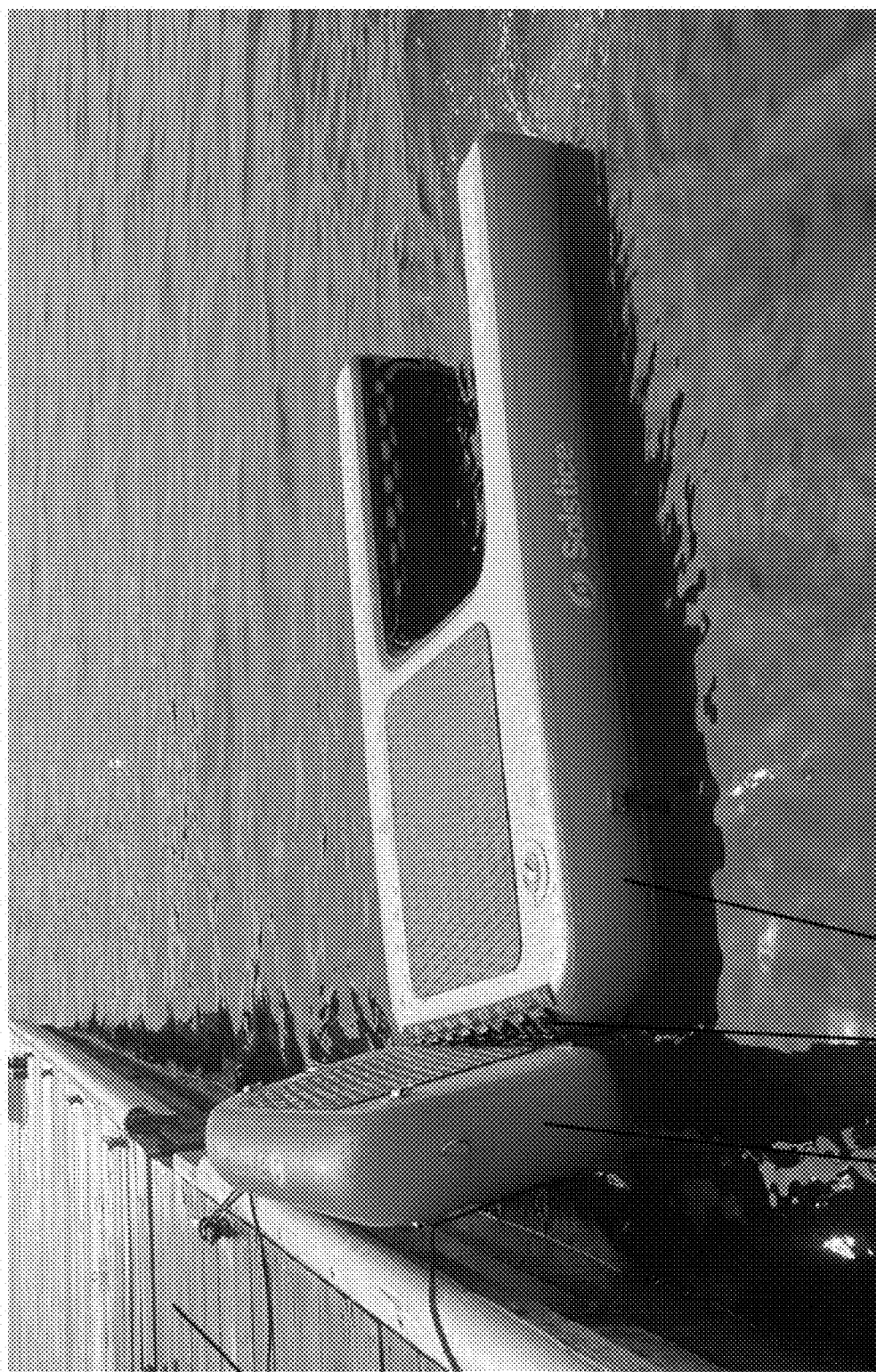
FIGS. 15-18 are left perspective views of an alternate configuration of the water egress system of FIG. 1 during an example use case with a bolster engaged against a dock in an angled extended configuration according to an embodiment.
Figure 16:
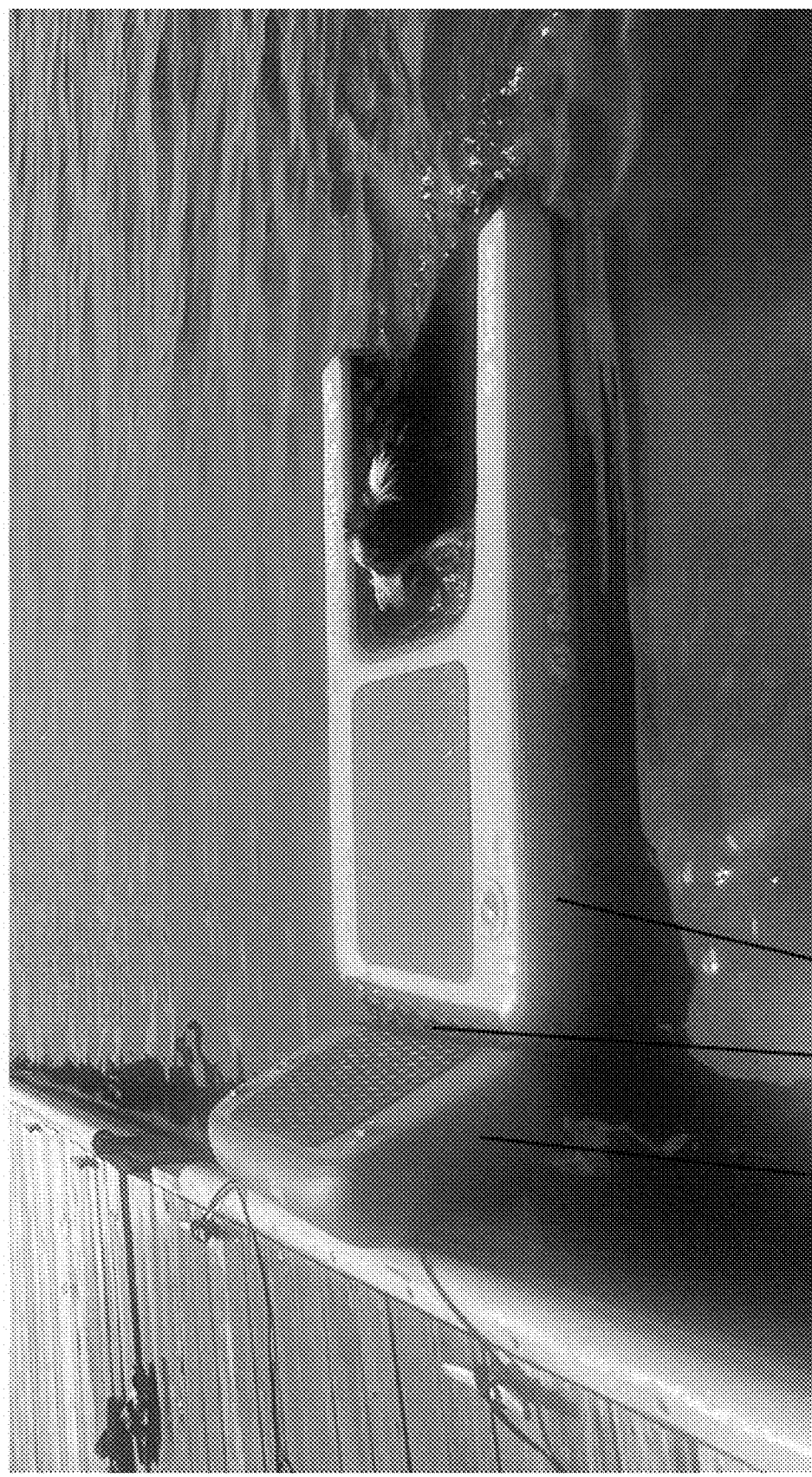
Figure 17:

In some embodiments, as shown in FIGS. 1-11, the bolster 104 is positioned proximate to the top surface 136 of the base 102 in a boost configuration to provide added height to the water egress system 100 for ease of egress to an elevated surface. In some embodiments, for example, the bolster 104 is engaged against or touching the top surface 136 of the base 102. In some embodiments, as shown in FIGS. 12-14, the bolster 104 is positioned adjacent to the base 102 in an extended configuration to provide added length to the water egress system 100 for ease of access to a more distant surface to which egress is desired. The corded attachment 300 is configured to act as a hinge between the base 102 and the bolster 104, where, for example, the bolster 104 may be rotated about the corded attachment 300 between the boost configuration and the extended configuration. As an example, the corded attachment 300 may define an axis about which the bolster 104 may rotate between convertible configurations. In some embodiments, as shown in FIGS. 15-18, the bolster 104 is rotated about the corded attachment 300 and positioned adjacent to and at a variable angle to the base 102 in an angled extended configuration. In some embodiments, the variable angle may be an angle between the angle of the bolster 104 relative to the base 102 when the water egress system 100 is in the boost configuration (e.g., about 0 degrees or another small angle), and the angle of the bolster 104 relative to the base 102 when the water egress system 100 is in the extended configuration (e.g., about 180 degrees or another similar angle). The added height provided in the boost configuration and the angled extended configuration may inhibit the water egress system 100 from sliding under an elevated surface, such as the dock 402, a boat swim platform, or other elevated surface, for example, as show in FIGS. 4, 6, and 15.

In some embodiments, the bolster 104 may be tensioned against a surface of the base 102. For example, the tension of the bolster 104 against the top surface 136 of the base 102 may be increased or decreased by adjusting the strap 118. Also or alternatively, the bolster 104 may be tensioned against the top surface 136 of the base 102 using at least one of a rope, a cord, a bungee, an elastic, a carabiner, a clip, a hook, and a clasp. In some embodiments, the bolster 104 may also or alternatively be tensioned against any other surface of the base 102 using the strap 118 and attachment points 114, 116 and 120.

In some embodiments, the water egress system 100 is configured to be buoyant and portable. For example, the base 102 and the bolster 104 may comprise a material with drop stitch inflatable technology. Drop stitch fabric utilizes thousands of polyester threads to create flat surfaces that can be inflated to durable rigidity, enabling hard-shell performance with easy transportation and storage. The base 102 and the bolster 104 may also or alternatively comprise any other material that is configured to be portable, inflatable, foam filled, or buoyant in any another manner.

A process of using the water egress system 100 comprises attaching the bolster 104 to the base 102 by, for example, the corded attachment 300, or any attachment mechanism discussed above. As shown in FIGS. 1-3, the bolster 104 may be positioned proximate to the top surface 136 of the base 102 at the attachment point 126 in the boost configuration. This boost configuration provides added height to the water egress system 100 and is configured to allow an individual or pet access to an elevated surface to which egress is desired. The bolster 104 may be secured in place in the boost configuration by, for example, the strap 118 connecting the attachment points 114 and 116. A tension of the bolster 104 against the top surface 136 of the base 102 may also be adjusted by adjusting the strap 118.

The water egress system 100 may be transitioned to the extended configuration where the bolster 104 is adjacent to the base 102, as shown in FIGS. 12-14. For example, in the extended configuration, a standing surface of the bolster 104, e.g., grip surface 134, may be level with or at about the same level as a standing surface of the base 102, e.g., top surface 136 and grip surface 122. The extended configuration provides added length to the water egress system 100 and is configured to allow an individual or pet access to surfaces which are further away from the attachment point 126.

In the extended configuration, the bolster 104 may be attached to the base 102 at the attachment point 126 by, for example, the corded attachment 300 or any attachment mechanism discussed above. The strap 118 may also be attached to the attachment points 114 and 116 to hold the bolster 104 against a side surface 306 of the base 102 and in some embodiments, to tension the bolster 104 against the side surface 306 of the base 102. To transition the water egress system 100 from the boost configuration to the extended configuration or vice versa, the bolster 104 may be rotated about the attachment point 126, e.g., about the axis of the corded attachment 300 in some embodiments, while remaining attached to the base 102. In some embodiments, for example, the bolster 104 may be rotated relative to the base 102 about a hinge, a flap of material, or other attachment mechanism as described above to transition the water egress system 100 between configurations.

The water egress system 100 may be transitioned to a detached configuration where the bolster 104 is removed from the base 102 by, for example, detaching the corded attachment 300 and the strap 118 from attachment points 114 and 116. Attachment points 116 may be utilized to, for example, removably or permanently attach the water egress system 100 to a boat, dock, pool, or any other elevated surface to which egress is desired. In some embodiments, a plank or bridge component may be attached to the attachment points 116 to extend a distance from the elevated surface from which the water egress system 100 may be deployed. The bolster 104 may be reattached to the base 102 by, for example, attaching the corded attachment 300 at attachment point 126, the strap 118 at attachment points 114 and 116 or both.

As shown in FIGS. 15-18, the water egress system 100 may be transitioned to an angled extended configuration by rotating the bolster 104 about the corded attachment 300 and positioning the bolster 104 adjacent to and at a variable angle to the base 102. In some embodiments, the variable angle may be at least the angle of the bolster 104 relative to the base 102 when the water egress system 100 is in the extended configuration, and at most 180 degrees relative to the base 102. In the angled extended configuration, the water egress system 100 is removably or permanently attached to a boat, dock, pool, or any other elevated surface or platform to which egress is desired via at least one of attachment points 120 and 114 of the bolster 104. In the angled extended configuration, the bolster 104 is configured to function as a ramp, e.g., providing access from base 102 up to a surface that is elevated relative to base 102. Depending at least in part on the variable angle of attachment between the bolster 104 and the base 102, the angled extended configuration provides added variable height and variable length to the water egress system 100 for ease of access to an elevated surface to which egress is desired. For example, as shown in FIGS. 15-18, the angled extended configuration may provide access to an elevated surface that is in between a height of the top surface of the base 102 and a length of the bolster 104 in the direction of egress or ingress.

The water egress system 100 may be transitioned between any of the boost, extended, angled extended, or detached configurations, in any order. For example, the water egress system 100 may be transitioned between the boost configuration and the detached configuration, between the detached configuration and the extended configuration, and between the boost configuration, the angled extended configuration, and the extended configuration in any order.

FIGS. 1 through 18 are conceptual illustrations allowing for an explanation of the disclosed embodiments of the invention. Notably, the figures and examples above are not meant to limit the scope of the invention to a single embodiment, as other embodiments are possible by way of interchange of some or all of the described or illustrated elements. Moreover, where certain elements of the disclosed embodiments can be partially or fully implemented using known components, only those portions of such known components that are necessary for an understanding of the disclosed embodiments are described, and detailed descriptions of other portions of such known components are omitted so as not to obscure the disclosed embodiments. In the present specification, an embodiment showing a singular component should not necessarily be limited to other embodiments including a plurality of the same component, and vice-versa, unless explicitly stated otherwise herein. Moreover, terms in the specification or claims are not intended to be ascribed an uncommon or special meaning unless explicitly set forth as such. Further, the disclosed embodiments encompass present and future known equivalents to the known components referred to herein by way of illustration.

The foregoing description will so fully reveal the general nature of the disclosed embodiments that others can, by applying knowledge within the skill of the relevant art(s) (including the contents of the documents cited and incorporated by reference herein), readily modify and/or adapt for various applications such specific embodiments, without undue experimentation, without departing from the general concept of the disclosed embodiments. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A water egress system comprising:
a buoyant base comprising arms extending outwardly from the base and a ramp between the arms;
a bolster disposed proximate to a surface of the base; and
an attachment mechanism that is configured to secure the bolster to the base.

2. The water egress system of claim 1, wherein the base includes a top surface and a bottom surface, wherein the top surface of the base is opposite the bottom surface of the base when the bottom surface of the base is positioned on water.

3. The water egress system of claim 1, wherein the arms include a first arm and a second arm parallel to each other.

4. The water egress system of claim 1, wherein the arms extend outwardly perpendicular to the base.

5. The water egress system of claim 1, wherein the arms extend from an end portion of the base, wherein the end portion is opposite an attachment point of the bolster.

6. The water egress system of claim 5, wherein the bolster is removably attached to the base by the attachment mechanism at the attachment point.

7. The water egress system of claim 1, wherein the water egress system is configured to transition between a boost configuration and an extended configuration, the bolster being disposed proximate to a top surface of the base when the water egress system is in the boost configuration, and the bolster being disposed proximate to a side surface of the base when the water egress system is in the extended configuration.

8. The water egress system of claim 7, wherein the water egress system has a first height and a first length when the water egress system is in the boost configuration and a second height and a second length when the water egress system is in the extended configuration, the first height being greater than the second height, and the first length being smaller than the second length.

9. The water egress system of claim 7, wherein the water egress system is configured to transition to an angled extended configuration, wherein, when in the angled extended configuration:
the bolster is disposed proximate to the side surface of the base at a variable angle to the base;
the water egress system has a variable height based at least in part on the variable angle, wherein the variable height is between the second height and a third height, the third height being greater than the first height; and
the water egress system has a variable length based at least in part on the variable angle between the first length and the second length.

10. The water egress system of claim 7, wherein, when in the extended configuration, the top surface of the bolster is about level with the top surface of the base.

11. The water egress system of claim 1, further comprising a strap, wherein:
the bolster comprises a first attachment point;
the base comprises a second attachment point; and
the strap is configured to secure the bolster to the base using the first attachment point and the second attachment point.

12. The water egress system of claim 11, further comprising a third attachment point that is configured to removably attach the water egress system to an elevated platform.

13. A water egress system comprising:
a buoyant base comprising arms extending outwardly from the base and a ramp between the arms;
a bolster disposed proximate to a surface of the base; and
an attachment mechanism that is configured to secure the bolster to the base, wherein at least one of the base and the bolster comprise a grip surface.

14. The water egress system of claim 13, wherein the grip surface includes at least one of a non-slip or slip-inhibiting design, material, or coating.

15. The water egress system of claim 13, wherein the grip surface includes at least one of a claw resistant design, material, or coating configured to inhibit puncture, rupture, scratch, rip, tear, perforation, laceration, or any other form of damage to the base.

16. The water egress system of claim 13, wherein the grip surface comprises a traction pad, wherein the traction pad includes a diamond groove texture.

17. The water egress system of claim 13, wherein the grip surface comprises a high-density EVA-70 foam, wherein the EVA-70 foam is operatively associated with a top surface of the base.

18. The water egress system of claim 13, wherein the arms comprise a first arm and a second arm parallel to each other extending perpendicularly from the base.

19. The water egress system of claim 13, wherein the water egress system is configured to transition between a boost configuration and an extended configuration, the bolster being disposed proximate to a top surface of the base when the water egress system is in the boost configuration, and the bolster being disposed proximate to a side surface of the base when the water egress system is in the extended configuration.

20. The water egress system of claim 19, wherein the water egress system is configured to transition to an angled extended configuration, wherein, when in the angled extended configuration:
the bolster is disposed proximate to the side surface of the base at a variable angle to the base;
the water egress system has a variable height based at least in part on the variable angle, wherein the variable height is between the second height and a third height, the third height being greater than the first height; and
the water egress system has a variable length based at least in part on the variable angle between the first length and the second length.

21. The water egress system of claim 19, wherein, when in the extended configuration, the top surface of the bolster is about level with the top surface of the base.

22. A water egress system comprising:
a buoyant base comprising a ramp;
a bolster disposed proximate to a surface of the base; and
an attachment mechanism that is configured to secure the bolster to the base, wherein the water egress system is portable, wherein the base and the bolster comprise a material including drop stitch inflatable technology.

23. The water egress system of claim 22, wherein the base and the bolster comprise any one of a material that is portable, inflatable, foam filled, or buoyant.

24. The water egress system of claim 22, wherein the buoyant base comprises arms extending outwardly from the base, wherein the ramp is between the arms.

25. The water egress system of claim 24, wherein the arms comprise a first arm and a second arm parallel to each other extending perpendicularly from the base.

26. The water egress system of claim 22, wherein the water egress system is configured to transition between a boost configuration and an extended configuration, the bolster being disposed proximate to a top surface of the base when the water egress system is in the boost configuration, and the bolster being disposed proximate to a side surface of the base when the water egress system is in the extended configuration.

27. The water egress system of claim 26, wherein the water egress system is configured to transition to an angled extended configuration, wherein, when in the angled extended configuration:
   the bolster is disposed proximate to the side surface of the base at a variable angle to the base;
   the water egress system has a variable height based at least in part on the variable angle, wherein the variable height is between the second height and a third height, the third height being greater than the first height; and
   the water egress system has a variable length based at least in part on the variable angle between the first length and the second length.

28. The water egress system of claim 26, wherein, when in the extended configuration, the top surface of the bolster is about level with the top surface of the base.

\* \* \* \* \*